(12) United States Patent
Chen et al.

(10) Patent No.: US 8,938,909 B2
(45) Date of Patent: Jan. 27, 2015

(54) **PROCESS OF RAPID ISOLATING *MONOSTROMA LATISSIMUM* FILAMENTOUS BODIES FOR MASS-SCALE BREEDING**

(71) Applicant: National Taiwan Ocean University, Keelung (TW)

(72) Inventors: Yean-Chang Chen, Keelung (TW); Roger Huang, Keelung (TW)

(73) Assignee: National Taiwan Ocean University, Keelung (TW)

( * ) Notice: Subject to any disclaimer, the term of this patent is extended or adjusted under 35 U.S.C. 154(b) by 242 days.

(21) Appl. No.: 13/684,761

(22) Filed: Nov. 26, 2012

(65) Prior Publication Data

US 2014/0144074 A1   May 29, 2014

(51) Int. Cl.
*A01H 13/00* (2006.01)
*A01G 33/00* (2006.01)

(52) U.S. Cl.
CPC ........................................ *A01G 33/00* (2013.01)
USPC .......................................... 47/1.4; 47/58.1 SE

(58) Field of Classification Search
USPC ...... 47/1.4, 58.1 R, 1.01 R, 58.1 LS, 58.1 SE, 47/DIG. 6, 59 R, 60, 61, 62 R, 62 A, 62 N; 435/257.1, 261, 946
See application file for complete search history.

(56) References Cited

U.S. PATENT DOCUMENTS

| | | | | |
|---|---|---|---|---|
| 4,253,271 A * | 3/1981 | Raymond | ......................... | 47/1.4 |
| 4,320,594 A * | 3/1982 | Raymond | ......................... | 47/1.4 |
| 4,554,390 A * | 11/1985 | Curtain et al. | ................ | 568/870 |
| 4,869,017 A * | 9/1989 | Bird et al. | ......................... | 47/1.4 |
| 4,958,460 A * | 9/1990 | Nielson et al. | ..................... | 47/1.4 |
| 5,801,050 A * | 9/1998 | Uchida et al. | ............... | 435/257.1 |
| 5,935,842 A * | 8/1999 | Moll | ........................... | 435/257.1 |
| 6,579,714 B1 * | 6/2003 | Hirabayashi et al. | ....... | 435/292.1 |
| 7,712,250 B2 * | 5/2010 | Chen et al. | ........................ | 47/1.4 |
| 7,905,049 B2 * | 3/2011 | Erd | .................................. | 47/1.4 |
| 2002/0034817 A1 * | 3/2002 | Henry et al. | ................ | 435/257.1 |
| 2008/0005959 A1 * | 1/2008 | Chen et al. | ........................ | 47/1.4 |

* cited by examiner

*Primary Examiner* — Trinh Nguyen
(74) *Attorney, Agent, or Firm* — Jackson IPG PLLC

(57) ABSTRACT

A simple alternative to separate filamentous bodies of *Monostroma latissimum* algae (large green algae) as seed stock. The filamentous bodies are easily separated and prepared for cultivation. At low luminosity (50 μm mole $s^{-1}m^{-2}$), the filamentous bodies grow into the filamentous colony. If the filamentous colony is in turns irradiated at the luminosity greater than 100 μm mole $s^{-1}m^{-2}$, it is turning into fronds. Thereby the filamentous bodies are evenly distributed into small segments so as to penetrate through the cotton rope for algal mass cultivation and further grow into fronds at high luminosity.

3 Claims, 3 Drawing Sheets

PROCESS OF RAPID ISOLATING *MONOSTROMA LATISSIMUM* FILAMENTOUS BODIES FOR MASS-SCALE BREEDING

BACKGROUND OF THE INVENTION

1. Field of the Invention

The present invention relates to a process of rapid isolating *Monostroma latissimum* filamentous bodies for mass-scale breeding. Particularly, it relates to a simple alternative to separate filamentous bodies of *Monostroma latissimum* algae (large green algae) as seed stock for breeding algae. More particularly, it relates to a process of easily isolating algal filamentous bodies for cultivation, in which the filamentous bodies are evenly distributed into small segments so as to penetrate through the cotton rope for algal mass cultivation and further grow into fronds at high luminosity.

2. Description of Related Art

*Monostroma latissimum* (or called *Monostroma latissimum* algae) are common green algae having fronds of tiny single-cell thickness. Among the similar categories, *Monostroma latissimum* has been successfully put into large commercial scale for many years in Japan (Shokita, S., Kakazu, K., Tomori, A. & Toma, T. 1991. *Aquaculture in Tropical Areas IV.* Midori Shobo Co., Tokyo, Japan, 360 pp.). In Taiwan, *Monostroma latissimum* has been used as food additive and cultured by commercial aquaculture technology. This inventor published in 1998 the use of enzymes in breaking down algal cell walls in order to form protoplasts and dedifferentiating mature protoplasts to form algal filamentous bodies as seed stock (Chen, the YC 1998. Development of protoplasts from holdfasts and vegetative thallus of *Monostroma latissimum (Chlorophyta, Monostromataceae)* for algal seed stock. J. Phycol. 34:1075-81.). However, such a method requires expensive enzymes (i.e., cellulase, pectinase, etc.) and the large amount of sugar alcohols (such as mannitol, sorbitol, sugar alcohol) in order to maintain osmotic stability. In addition, isolation and cultivation of protoplasts are complicate and time-consuming Therefore, the prior art cannot meet the need for the users in actual use.

SUMMARY OF THE INVENTION

A main purpose of this invention is to provide a simple alternative to separate filamentous bodies of *Monostroma latissimum* algae (large green algae) as seed stock for breeding algae.

Another purpose of the invention is to provide a process of easily isolating algal filamentous bodies for cultivation, in which the filamentous bodies are evenly distributed into small segments so as to penetrate through the cotton rope for algal mass cultivation and further grow into fronds at high luminosity.

Still another purpose of the invention is to provide an apparatus used in rapid isolating *Monostroma latissimum* filamentous bodies for breeding in mass scale.

In order to achieve the above and other purposes, the process of rapid isolating *Monostroma latissimum* filamentous bodies for breeding in mass scale according to the invention at least includes the following Steps:

(A) formation of *Monostroma latissimum* germ cells:

*Monostroma latissimum* thalli are washed by filtered seawater. After other algae and fouling organisms are removed from the *Monostroma latissimum* thalli, the *Monostroma latissimum* thalli are left still in the filtered seawater with continuous observation. As soon as moving germ cells (or called gametes) release, they are collected and quickly placed in a *Monostroma latissimum* seedling incubator in which the germ cells are to be attached to a cotton rope;

(B) germination and cultivation of *Monostroma latissimum* seedlings:

After the *Monostroma latissimum* germ cells are put in the *Monostroma latissimum* seedling incubator, the seedling incubator is placed at a location where the sunlight irradiates for germination at room temperature, so that these moving germ cells completely attach on the cotton rope to grow thallus seedlings which are visible to the naked eye. When the thallus seedlings grow to length of 0.5~1.0 mm, the filtered seawater with flow rate of 50~75 ml·sec$^{-1}$ is used for cultivation. The thallus seedlings contain at least a frond and at least a holdfast. The holdfast differentiates into filamentous bodies which are to attach on the cotton rope; and (C) rapid isolation of the filamentous bodies from the cultivated seedlings:

Under a dissecting microscope, the cotton rope is untied and the filamentous bodies are separated from the cotton rope. At low luminosity of less than 50 μm mole s$^{-1}$m$^{-2}$, an PG modified medium is used as a cultivation medium for cultivation at 24~30° C., so that the filamentous bodies turn into a filamentous colony as seed stock for breeding in mass scale. When the cultivation is carried out at high luminosity, the filamentous bodies differentiate into fronds.

At the above Step (C), the *Monostroma latissimum* filamentous bodies are rapid separated in an apparatus which is used for mass-scale breeding. The apparatus contains a plant incubator, a lighting unit and a temperature unit. The plant incubator at least has one accommodating area where the filamentous bodies separated from the cotton rope and the PG modified medium are injected into. The lighting unit and the temperature unit are respectively located at either side of the incubator. The light irradiation from the lighting unit is led to filamentous bodies placed at the accommodating area of the plant incubator. The temperature unit controls the cultivation environment for the filamentous bodies to be cultivated within the accommodating area of the plant incubator, and promotes the filamentous bodies to grow into a filamentous colony which further differentiates into fronds.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
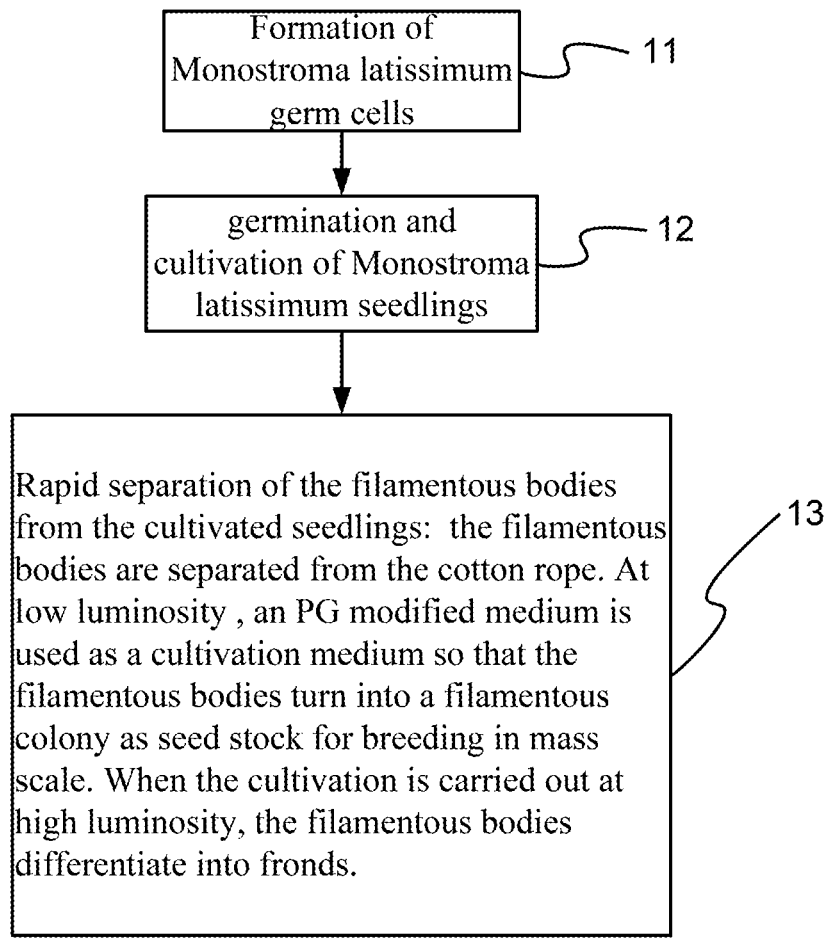
FIG. 1 is a flow chart of a process of rapid isolating *Monostroma latissimum* filamentous bodies for breeding in mass scale according to the invention.
Figure 2:
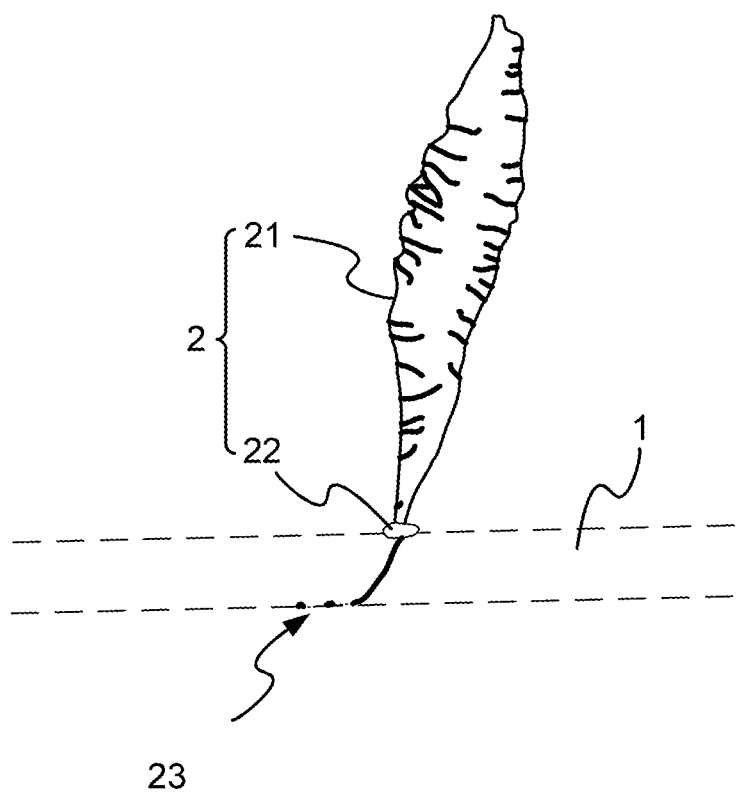
FIG. 2 is a schematic view of Step (B) of a process of rapid isolating *Monostroma latissimum* filamentous bodies for breeding in mass scale according to the invention.
Figure 3:
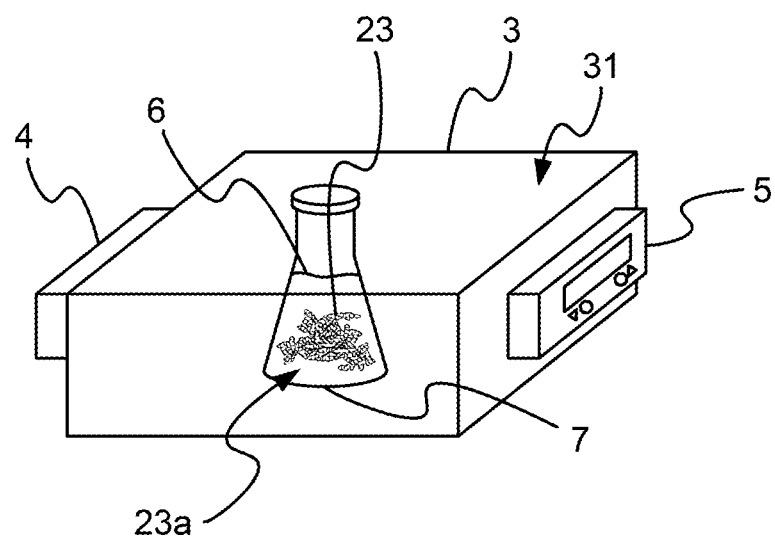
FIG. 3 is schematic view showing implementation of a process of rapid isolating *Monostroma latissimum* filamentous bodies for breeding in mass scale according to the invention.

FIG. 1 is a flow chart of a process of rapid isolating *Monostroma latissimum* filamentous bodies for breeding in mass scale according to the invention. FIG. 2 is a schematic view of Step (B) of a process of rapid isolating *Monostroma latissimum* filamentous bodies for breeding in mass scale according to the invention. FIG. 3 is schematic view showing implementation of a process of rapid isolating *Monostroma latissimum* filamentous bodies for breeding in mass scale according to the invention. As shown, the process of rapid isolating *Monostroma latissimum* filamentous bodies for breeding in mass scale according to the invention at least includes the following Steps:

(A) Step 11: formation of *Monostroma latissimum* germ cells

*Monostroma latissimum* thalli are washed by filtered seawater. After other algae and fouling organisms are removed from the *Monostroma latissimum* thalli, the *Monostroma latissimum* thalli are left still in the filtered seawater with continuous observation. As soon as moving germ cells (or called gametes) release, they are collected and quickly placed in a *Monostroma latissimum* seedling incubator in which the germ cells are to be attached to a cotton rope 1;

(B) Step 12: germination and cultivation of *Monostroma latissimum* seedlings

After the *Monostroma latissimum* germ cells are put in the *Monostroma latissimum* seedling incubator, the seedling incubator is placed at a location where the sunlight irradiates for germination at room temperature, so that these moving germ cells completely attach on the cotton rope to grow thallus seedlings which are visible to the naked eye. When the thallus seedlings grow to length of 0.5~1.0 mm, the filtered seawater with flow rate of 50~75 ml·sec$^{-1}$ is used for cultivation. As shown in FIG. 2, the thallus seedlings 2 contain at least a frond 21 and at least a holdfast 22. The holdfast 22 differentiates into filamentous bodies 23 which are to attach on the cotton rope; and (C) Step 13: rapid isolation of the filamentous bodies from the cultivated seedlings:

Under a dissecting microscope, the cotton rope is untied and the filamentous bodies are separated from the cotton rope. At low luminosity of less than 50 μm mole s$^{-1}$m$^{-2}$, an PG modified medium is used as a cultivation medium for cultivation at 24~30° C., so that the filamentous bodies turn into a filamentous colony as seed stock for breeding in mass scale. When the cultivation is carried out at high luminosity of 100 μm mole s$^{-1}$m$^{-2}$ and temperature of 16~30° C., the filamentous bodies are differentiated to fronds.

The cotton rope in the above Steps has a diameter of 0.1 cm, and can be replaced with a plastic one.

At the above Step (C), the *Monostroma latissimum* filamentous bodies are rapid separated in an apparatus which is used for mass-scale breeding and can be the one as shown in FIG. 3. The apparatus as shown in FIG. 3 contains a plant incubator 3, a lighting unit 4 and a temperature unit 5. The plant incubator 3 at least has one accommodating area 31 where the filamentous bodies 23 separated from the cotton rope 1 and the PG modified medium 6 are injected into. The lighting unit 4 and the temperature unit 5 are respectively located at either side of the incubator 3. The light irradiation from the lighting unit 4 is led to filamentous bodies 23 placed at the accommodating area 31 of the plant incubator 3. The temperature unit 5 controls the cultivation environment for the filamentous bodies 23 to be cultivated within the accommodating area 31 of the plant incubator 3, and promotes the filamentous bodies 23 to grow into a filamentous colony 23a which further differentiates into fronds.

In a preferred embodiment of the present invention, the *Monostroma latissimum* thalli are washed by the filtered seawater, and placed still in the filtered seawater after other algae and fouling organisms are removed. Simulating low tide situation after rain facilitates to release the germ cells from the *Monostroma latissimum* algae. The released germ cells are collected to the seedling incubator, being attached to the cotton rope. Then these germ cells are cultivated by being placed at the location where the sun can irradiate so that these germ cells in moving situation can completely attach to the cotton rope and grow into the seedlings which are visible to the naked eyes. Then a small portion (about 1 cm) of the cotton rope is taken to place in a petri dish containing PG modified medium and is observed under a dissecting microscope. The cotton rope 1 is untied by using fine-tipped tweezers into dispersed fibers containing the seedlings 2. It can be observed under a dissecting microscope within the holdfast 22 that the holdfast 22 consists of wired substances and some filamentous bodies 23 hidden in these fibers exist. During the thallus seedling cultivation, it is found from the holdfast 22 of the seedlings 2 that some filamentous bodies 23 have penetrated the fibers of the cotton rope 1. Then the filamentous bodies 23 are taken out and cultivated in a flask containing the PG modified medium in the plant incubator 3, with the luminosity of 50 μm mole s$^{-1}$m$^{-2}$ provided by the lighting unit 4 and the temperature environment at 24° C. controlled by the temperature unit 6. In low-luminosity cultivation, the filamentous bodies 23 grow into the filamentous colony 23a as thallus seed stock for mass-scale breeding. When the luminosity is set to 200 μm mole s$^{-1}$m$^{-2}$ while the temperature is set to 18~24° C., the filamentous bodies 23 differentiate into fronds, therefore completing the algae breeding in mass scale.

The present invention proposes a simple alternative to separate filamentous bodies of *Monostroma latissimum* algae (large green algae) as seed stock. Compared to the conventional process of isolating the algal protoplasts using enzymes, the filamentous bodies are easily separated and prepared for cultivation. At low luminosity (50 μm mole s$^{-1}$m$^{-2}$), the filamentous bodies grow into the filamentous colony. If the filamentous colony is in turns irradiated at the luminosity greater than 100 μm mole s$^{-1}$m$^{-2}$, it is turning into fronds. Thereby the filamentous bodies are evenly distributed into small segments so as to penetrate through the cotton rope for algal mass cultivation and further grow into fronds at high luminosity.

In summary, the present invention relates to a process of isolating *Monostroma latissimum* filamentous bodies for breeding in mass scale, which effectively improves the shortages in the prior art. The filamentous bodies are easily separated and prepared for cultivation. At low luminosity, the filamentous bodies grow into the filamentous colony. When the luminosity is greater than 100 μm mole s$^{-1}$m$^{-2}$, the filamentous bodies are turning into fronds. The filamentous bodies are evenly distributed into small segments so as to penetrate through the cotton rope for algal mass cultivation. At high luminosity, they grow into fronds. This makes the invention more progressive and more practical in use which complies with the patent law.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A process of rapid isolating *Monostroma latissimum* filamentous bodies for breeding in mass scale at least comprising the following Steps:

(A) forming of *Monostroma latissimum* germ cells:

*Monostroma latissimum* thalli are washed by filtered seawater; after other algae and fouling organisms are removed from the *Monostroma latissimum* thalli, the Monostroma latissimum thalli are left still in the filtered seawater with continuous observation; as soon as moving germ cells (or called gametes) release, they are collected and quickly placed in a *Monostroma latissimum* seedling incubator in which the germ cells are to be attached to a cotton rope;

(B) germination and cultivating of *Monostroma latissimum* seedlings:

after the *Monostroma latissimum* germ cells are put in the *Monostroma latissimum* seedling incubator, the incubator is placed at a location where the sunlight irradiates for germination at room temperature, so that these moving germ cells completely attach on the cotton rope to grow thallus seedlings which are visible to the naked eye; when the thallus seedlings grow to length of 0.5~1.0 mm, the filtered seawater with flow rate of 50~75 ml·sec$^{-1}$ is used for cultivation; the thallus seedlings contain at least a frond and at least a holdfast; the holdfast differentiates into filamentous bodies which are to attach on the cotton rope; and (C) performing a rapid isolation of the filamentous bodies from the cultivated seedlings:

under a dissecting microscope, the cotton rope is untied and the filamentous bodies are separated from the cotton rope; then at low luminosity of less than 50 μm mole s$^{-1}$m$^{-2}$, an PG modified medium is used as a cultivation medium for cultivation at 24~30° C., so that the filamentous bodies grow into a filamentous colony as seed stock for breeding in mass scale; and finally at high luminosity of 100 μm mole s$^{-1}$m$^{-2}$ and temperature of 16~30° C., the filamentous colony further differentiates into fronds.

2. The process of claim 1, wherein the cotton rope has a diameter of 0.1 cm.

3. The process of claim 1, wherein the cotton rope can be a plastic rope.

* * * * *